(12) United States Patent
Kurita et al.

(10) Patent No.: US 7,216,548 B2
(45) Date of Patent: May 15, 2007

(54) CRANE EQUIPPED WITH INSPECTION DEVICE

(75) Inventors: Koichi Kurita, Hiroshima (JP);
Masanori Masumoto, Hiroshima (JP);
Toshiyuki Kusano, Hiroshima (JP);
Koji Uchida, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/029,460

(22) Filed: Jan. 6, 2005

(65) Prior Publication Data

US 2006/0042397 A1    Mar. 2, 2006

(30) Foreign Application Priority Data

Aug. 24, 2004    (JP)    ............................. 2004-243900

(51) Int. Cl.
*G01L 1/24* (2006.01)
(52) U.S. Cl. .............................. 73/800; 378/51; 378/57
(58) Field of Classification Search ................. 73/800; 378/51, 57
See application file for complete search history.

(56) References Cited

U.S. PATENT DOCUMENTS

| | | | |
|---|---|---|---|
| 5,838,759 A * | 11/1998 | Armistead | .................... 378/57 |
| 6,542,580 B1 * | 4/2003 | Carver et al. | .................. 378/57 |
| 6,768,421 B1 | 7/2004 | Alioto et al. | |
| 6,778,631 B2 * | 8/2004 | Franke | ........................ 378/57 |
| 6,845,873 B1 * | 1/2005 | Chattey | ...................... 212/270 |
| 6,936,820 B2 * | 8/2005 | Peoples | ................... 250/336.1 |
| 2003/0201394 A1 | 10/2003 | Peoples | |
| 2004/0156477 A1 | 8/2004 | Bjorkholm | |

FOREIGN PATENT DOCUMENTS

| | | |
|---|---|---|
| JP | 2004-203622 A | 7/2004 |
| JP | 2004203622 | 7/2004 |
| WO | 98/00681 | 1/1998 |

\* cited by examiner

*Primary Examiner*—Edward Lefkowitz
*Assistant Examiner*—Freddie Kirkland, III
(74) *Attorney, Agent, or Firm*—Lowe Hauptman & Berner, LLP

(57) ABSTRACT

The invention aims at providing a crane equipped with an inspection device that can maintain excellent inspection conditions without decreasing cargo transporting efficiency. On a container transporting route of a quay crane, a truck (position adjustment device), is provided moveably in a direction across this transporting route. An inspection device, which inspects the container, is provided on this truck. An upper part frame, which projects above the inspection device, and a lower part frame, which projects under the inspection device, are provided on the truck. An upside position detector, which detects the relative position of the container and the inspection device in the direction of movement of the truck, is provided in a position higher than that of the inspection device of the upper frame. A control device is provided, which controls operation of the position adjustment device based on detection results of the upside position detector so that the inspection device and the container are positioned appropriately for inspection.

4 Claims, 3 Drawing Sheets

CRANE EQUIPPED WITH INSPECTION DEVICE

RELATED APPLICATIONS

The present application is based on, and claims priority from Japanese Application Number 2004-243900, filed on Aug. 24, 2004, the disclosure of which is hereby incorporated by reference herein in its entirety.

BACKGROUND OF THE INVENTION

1. Field of the Invention

The present invention relates to a crane equipped with an inspection device.

2. Description of Related Art

Recently, there has been an increase in the illegal importation of suspicious items hidden inside containers. Therefore, when importing and exporting containers, especially at a container terminal of a harbor, it has become increasingly important to quickly discover and uncover the suspicious items by inspecting inside the container. Particularly from the viewpoint of decreasing inspection manpower or maintaining the status of cargoes, there has been a demand for a method which allows nondestructive inspection from outside without opening the container.

As an inspection device that nondestructively inspects for suspicious items in a container, there is for example a straddle inspection system described in Published Japanese translation No. 2000-514183 of PCT (FIG. 1, FIG. 4). This straddle inspection system has a transmission radiation source and a detector which detects radiation, installed on a straddle crane having just sufficient space to enable a container to pass in between, and by self-propelling this straddle crane to relatively move the container between the transmission radiation source and the detector, a radiographic image of the container is obtained, and the presence of suspicious items is inspected for based on this radiographic image.

However, there is a problem in that the main inspection object of this straddle inspection system is stored containers, in the case where, for example, the containers are directly loaded into a vessel without being stored, cargo transporting efficiency decreases. Furthermore, in the inspection device, the positional relationship of the inspection device and the container changes depending on the positional relationship of the straddle crane and the container. Hence the inspection condition changes at each inspection. Therefore, inspection accuracy is not constant and the analysis of inspection results is time-consuming.

BRIEF SUMMARY OF THE INVENTION

The present invention takes into consideration the above situation, with an object of providing a crane equipped with an inspection device that can maintain excellent inspection conditions without decreasing cargo transporting efficiency.

In order to address the above problems, the crane equipped with an inspection device of the present invention employs the following means.

That is to say, the crane equipped with an inspection device according to the present invention is a crane having an inspection device, which inspects a cargo, the crane comprising: a main body of the inspection device; a holding part which holds said cargo; a holding part drive device which moves said holding part along a transporting route; a position adjustment device which adjusts the position of said inspection device with respect to said transporting route; a position detector which detects the relative positions of said inspection device and said cargo; and a control device which controls operation of said position adjustment device based on detection results of said detector so that said inspection device and said cargo are positioned appropriately for inspection.

In the crane equipped with the inspection device constructed in this way, the position adjustment device and the control device adjust the position of the inspection device with respect to the transporting route, based on the detection results of the position detector, and the inspection device and the cargo are positioned appropriately for inspection.

Here, in addition to non-destructive inspection of the inside of a container, the quay crane equipped with an inspection device according to the present invention may be employed for the purpose of, for example, inspection of outward appearance, or reading labels and such.

This crane may also be used as a quay crane.

With a crane constructed in this way, when containers are transported between the container terminal and the vessel, container inspection can be performed using the inspection equipment. That is to say, a suspicious container can be identified at an early stage by performing inspection of the container at the first stage of receipt at the container terminal, or the contents of the container at shipping can be guaranteed by performing the inspection of the container at the final stage of shipping from the container terminal.

Furthermore, the crane equipped with an inspection device may be provided with: a detector that detects radiation intensity; a plurality of radiation sources on either side of an inspection area into which the cargo, that respectively irradiate radiation to the same detector from different positions; a modulation device which respectively assigns a different modulation to each of the radiation emitted from the each of the radiation source; and an identification device which distinguishes the modulation assigned to the radiation that has entered the detector based on an output of the detector, and determines from which of said radiation sources the radiation has been irradiated.

This inspection device is a so called nondestructive inspection device which inspects the inside of the inspection object based on the radiographic image of the inspection object. However, it differs from a conventional nondestructive inspection device in that the radiation is respectively irradiated by the plurality of radiation sources from different positions, to the same detector through the inspection object. In other words, the radiation transmitted through the inspection object from different directions enters the one detector.

These radiations are respectively assigned different modulations by the modulation device for each radiation source. For the modulation device, a chopper or the like that modulates the radiation generated by the radiation source to convert the radiation which reaches the detector into a pulsed radiation of a frequency specific to the radiation source, is used.

The output of the detector when these modulated radiations enter the detector reflects the modulations assigned to the incident radiations. For example, in the case where the chopper is used as a modulation device, the output of the detector contains a frequency component at which the output fluctuates, at the same frequency as the modulation of the chopper.

The modulation assigned to the radiation that enters the detector is identified by the identification device based on this output of the detector, and which radiation source the radiation, which has entered the detector, is emitted from is identified based on the modulation information. For the identification device, for example, a lock-in amplifier or the like that takes out a signal of a frequency the same as the modulation due to the chopper from the output of the detector, is used.

Thus, in this inspection device, the radiation emitted from a plurality of radiation sources can be separately identified for each radiation source by one detector, even if the irradiated positions overlap.

As a result, in this inspection device, while having a construction where; a plurality of radiation sources are provided, the inspection area is set large, and the inspection object is inspected from a plurality of directions, fewer installations of expensive detectors are required compared to the conventional nondestructive inspection device, and a detector that is smaller than the one used for the conventional nondestructive inspection device can be used, so that the equipment cost can be kept low.

Moreover, by using a smaller detector, the deformation of the detector due to its own weight becomes smaller, and detection accuracy of the detector becomes higher so that more accurate non-destructive inspection can be performed.

Furthermore, the inspection device itself becomes smaller than the conventional one, so that more options of crane installation location become available and various operations become possible.

According to the crane equipped with an inspection device according to the present invention, the inspection of the cargo by the inspection device is performed under a constant condition, and excellent inspection results can always be obtained.

Moreover, since the inspection condition is maintained constantly in this way, inspection results of different containers can be compared easily, and automation or semi-automation of inspection result evaluation can be easily achieved.

DETAILED DESCRIPTION OF THE INVENTION

Hereunder, embodiments according to the present invention are described, with reference to the drawings.

First Embodiment

A first embodiment of the present invention is described below, with reference to FIG. 1 and FIG. 2.

Figure 1:
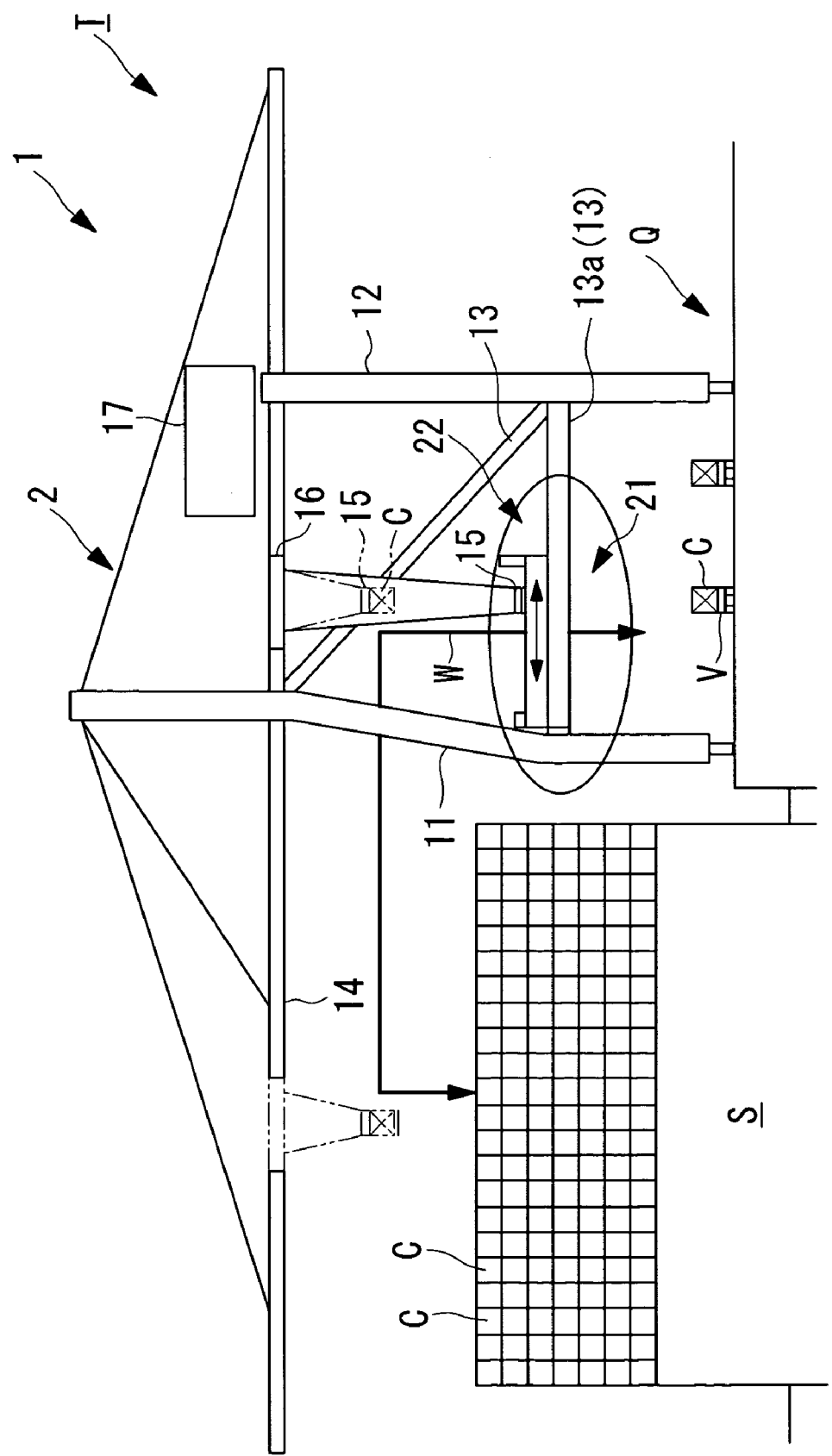
FIG. 1 is a side view showing the construction of a quay crane according to a first embodiment of the present invention.

In the present embodiment, as shown in FIG. 1, an example is given where the present invention is applied to a quay crane 1 that performs cargo handling operations between a container vessel S alongside of quay wall Q of a container terminal T provided on a harbor section, and a chassis V on the quay wall Q.

A main body 2 of the quay crane 1 is constructed with a boom 14 that extends to the upper side of the container vessel S, provided above front legs 11 and rear legs 12 that are mutually connected by connection members 13 and are respectively provided with wheels on their bottom ends.

The front legs and the rear legs 12 are substantially ladder shaped structural bodies being formed by respectively connecting a pair of columnar members by beams not shown in the diagram, and each of the column shaped members of the front legs 11 and the rear legs 12 are connected by the connection members 13. Here, of the connection members 13, the connection member 13 that is substantially horizontally provided between the front legs 11 and the rear legs 12 is a connection member 13a.

The boom 14, suspends a spreader 15 (holding part) that a container C is fixed onto, and is provided with a trolley 16 (holding part driving device) that can move along the boom 14, and a hoisting device 17 for winding the spreader 15 up and down. By suspending, winding up and down, and moving the container C with these, the container C is transferred between the container vessel S and a chassis V standing-by below the quay crane 1.

The operation of loading the container C from the container vessel S to the chassis V with this quay crane 1, is performed as described below.

First of all, the container C on the container vessel S is held by the spreader 15, and in this state, the container C is lifted substantially vertically up to a predetermined height by winding up the spreader 15 with the hoisting device 17. Next, the trolley 16 is moved along the boom 14, moving the container C along with the spreader 15 to the position right above the target chassis V. Then, by winding down the spreader 15 with the hoisting device 17, the container C is substantially vertically lowered towards the chassis V, and the container C is placed on the chassis V.

On the other hand, the operation of loading the container C from the chassis V into the container vessel S is performed in the reverse order to that described above.

That is to say, in this quay crane 1, the transporting route W of the container C as shown by the solid line in FIG. 1, is set to pass through the area enclosed by the front legs 11, the rear legs 12 and the connection member 13a.

Moreover, in this quay crane 1, the container C is transported so that the lengthwise direction thereof is substantially orthogonal to the lengthwise direction of the connection member 13a.

In the main body 2 of the crane, a truck 21 (position adjustment device) that can be moved along the lengthwise direction of the connection member 13a is provided on the connection member 13a.

Moreover, an inspection device 22 which inspects the container C handled by the quay crane 1 is provided on this truck 21. That is to say, the position of the inspection device 22 along the lengthwise direction of the connection member 13a can be adjusted by moving the truck 21 and it becomes possible to adjust the position of the inspection device 22 with respect to the vertical component of the transporting route W.

Figure 2:
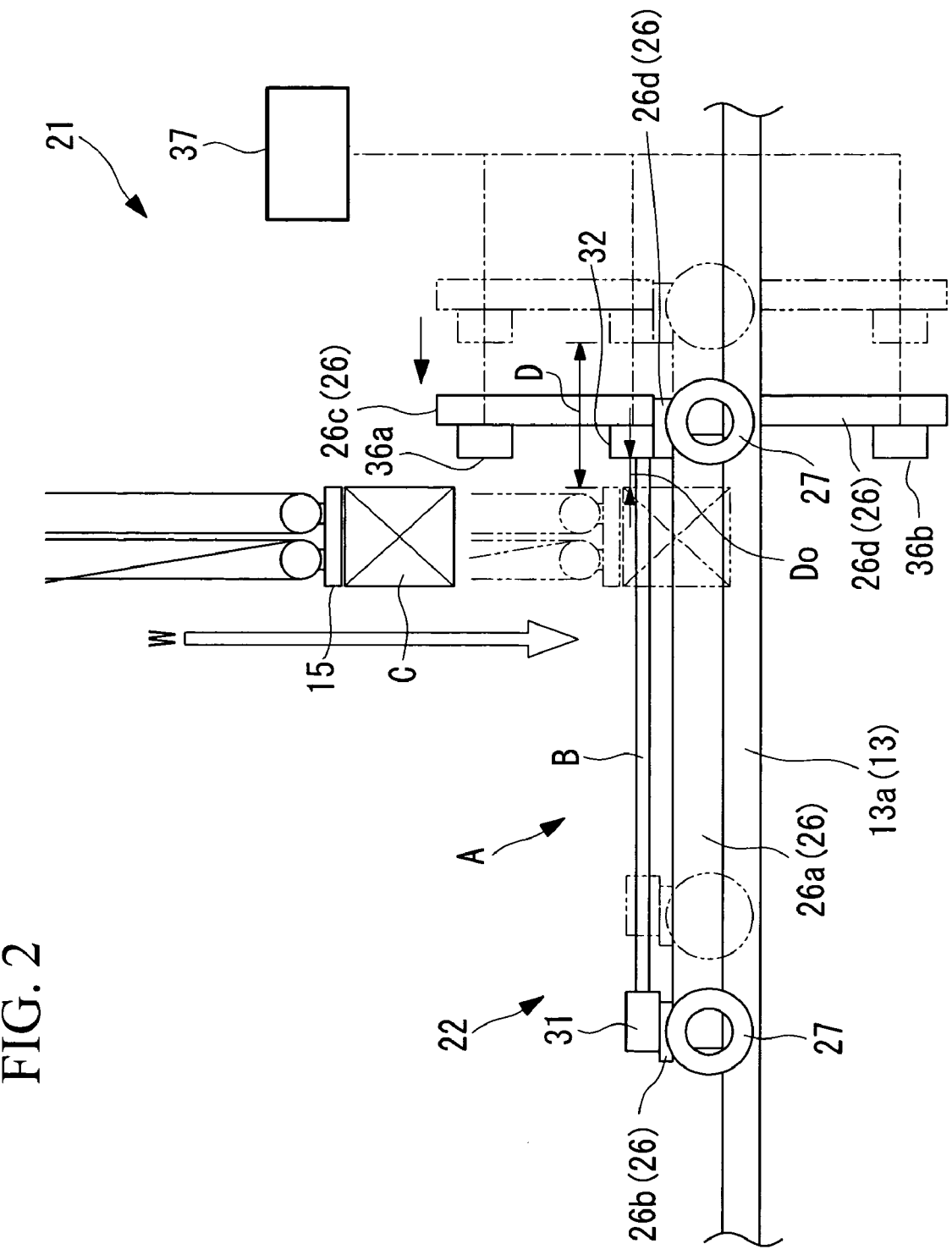
FIG. 2 is an enlarged view of FIG. 1.

As shown in FIG. 2 (an enlargement of the area enclosed by a circle in FIG. 1), the truck 21 has wheels 27 that are turned by a drive unit not shown, and that are attached to a frame 26 which is provided across the gap between the connection members 13a. The truck 21 can move along the connection members 13a by turning the wheels 27 with the drive unit.

In the present embodiment, the frame 26 has a main frame 26a provided on top of the pair of connection members 13a along the lengthwise direction of each member, and a pair of sub-frames 26b provided across these main frames 26a and distanced from each other, and the container C and the spreader 15 can pass through the region enclosed by these main frames 26a and sub-frames 26b.

Furthermore an upper part frame 26c, which projects above the inspection device 22, and a lower part frame 26d, which projects under the inspection device 22, are provided on one of the sub-frames 26b.

The inspection device 22 has a radiation source 31, which emits radiation such as γ rays or X-rays, provided on one of the sub-frames 26b, and a detector 32 which is provided on other sub-frame 26b, and which faces the radiation source 31. The area between the radiation source 31 and the detector 32 is an inspection area A of the inspection device 22.

The inspection device 22 is one which irradiates radiation from the radiation source 31 onto a container C which enters the inspection area A between the sub-frames 26b, and detects the radiation that has penetrated through the container C by means of the detector 32, and based on information for the intensity of the radiation detected by the detector 32 and information for the detected position, nondestructively inspects the entire inside of the container C.

The radiation source 31 and the detector 32 can be moved along the lengthwise direction of the connection parts 13a keeping the same position relative to each other by moving the truck 21.

Here, on the crane 1 equipped with the inspection device, if necessary a protective barrier for the radiation shielding is provided therearound.

For the radiation source 31, common radiation sources such as, those that use a radioactive isotope (RI) such as $Co_{60}$ (cobalt 60), or an X-ray generation device is used.

Also, for the detector 32, a radiation detection device that is commonly used for nondestructive inspection using radiation is used.

In the present embodiment, the detector 32 is provided on the sub-frame 26b on the side where the upper frame 26c and lower frame 26d are provided, and has a strip shape detection area along the lengthwise direction of this sub-frame 26b.

In the present embodiment, radiation sources that use $Co_{60}$ are used for the radiation sources 31.

Moreover, a detector array comprising a multiple array of radiation detectors is used for the detector 32. The radiation detector is constructed for example, from a pair of a scintillator and a photomultiplier, wherein the scintillator converts the incident radiation into visible light, and the photomultiplier detects and converts the light generated by the scintillator into an electrical signal. The area where the radiation detectors are disposed is the detection area, and the detector array finds the incident position of the radiation within the detection area based on which radiation detector an output is obtained from, and obtains the intensity of the incident radiation based on the magnitude of the output of the radiation detector.

Moreover, in the upper frame 26c, an upside position detector 36a is provided in a position above the inspection device 22. The upside position detector 36a detects the relative positions in the lengthwise direction of the connection member 13a, of the container C and the inspection device 22.

Similarly, an underside position detector 36b is provided on the lower frame 26d in a position below the inspection device 22. The underside position detector 36b detects the relative positions in the lengthwise direction of the connection member 13a, of the container C and the inspection device 22.

Also, there is provided on the quay crane 1 a control device 37 that controls the operation of the truck 21 based on; the position information of the container C from the upside position detector 36a and underside position detector 36b, the control signal of the trolley 16, and the control signal of the hoisting device 17, so that the inspection device 22 and container C have a positional relationship appropriate for inspection.

Nondestructive inspection of the container C that uses the quay crane 1 constructed in this way, is performed in parallel with transportation of the container C, during the process of transporting the container C along the transporting route W.

Specifically, by adjusting the position of the truck 21 and transporting the container C and passing it through the inspection area A between the subframes 26b on the transporting route W, each part of the container C from the front side in the transportation direction to the rear side in the transportation direction is sequentially exposed between the radiation sources 31 and the detector 32.

The inspection device 22 is operated in synchronization with the operation of the quay crane 1, and nondestructive inspection of the inside of the container C is performed from the bottom to the top of the container C, by the inspection device 22.

While the inspection by the inspection device 22 is being performed, the skew and sway of the container C are suppressed, and it is transported in a state in which its attitude with respect to the inspection device 22 is constant.

Here, the position of the trolley 16 on the boom 14 is adjusted to be positioned right above the chassis V that transports the container C. That is to say, the position to which the container C is elevated by the spreader 15 provided on the trolley 16 (the position of the vertical part of the transporting route W) is not always constant.

Then in this quay crane 1, the position of the inspection device 22 is adjusted corresponding to the position of the container C, and when the positional relationship of the inspection device 22 and the container C becomes appropriate for inspection, inspection is performed.

Hereunder, the flow of positioning the inspection device 22 with the quay crane 1 is specifically described.

First of all, the flow of positioning in the case where the container C passes the inspection area A downward (when loading from the container vessel S to the chassis V) is described.

In the process in which the trolley 16 positions the container C right above the chassis V, the control device 37 approximately detects the position of the container C in the direction along the boom 14, based on the control signal of the trolley 16, and controls the position of the truck 21 based on this position information, and sets the inspection device 22 and the container C in a positional relationship appropriate for inspection.

In the process of lowering the container C with the hoisting device 17, at the point when the container C reaches the position opposing the upper side position detection device 36a (at the point before the container C reaches the inspection area A), the upper side position detection device 36a detects the distance in the lengthwise direction of the boom 14 between the upper side position detection device 36a and the container C.

The control device 37 carries out a final positioning adjustment of the inspection device 22 based on the measured value of this upper side position detection device 36a.

Specifically, the control device 37 obtains a distance D at a current point in the lengthwise direction of the boom 14 between the detector 32 and the container C based on the measured value of the upper side position detection device 36a, and if the distance D is not a distance $D_0$ appropriate for inspection, operates the truck 21 and moves the inspection device 22 in the lengthwise direction of the boom 14 in order to make this distance D the appropriate distance $D_0$.

In the case where the container C passes the inspection area A upward (when loading from the chassis V to the container vessel S), first of all, as with the case where the container C passes the inspection area A downward, based on the control signal of the trolley 16 the truck 21 is controlled by the control device 37 to adjust the position of the inspection device 22.

In the process of raising the container C with the hoisting device 17, at the point when the container C reaches the position opposite the lower side position detection device 36b (at the point before the container C reaches the inspection area A), the lower side position detection device 36b detects the distance in the lengthwise direction of the boom 14 between the lower side position detection device 36b and the container C.

The control device 37 obtains a distance D at a current point in the lengthwise direction of the boom 14 between the detector 32 and the container C based on the measured value of the lower side position detection device 36b, and if the distance D is not a distance $D_0$ appropriate for inspection, operates the truck 21 and moves the inspection device 22 in the lengthwise direction of the boom 14 in order to make this distance D the appropriate distance $D_0$.

Thus, in this quay crane 1, the position of the inspection device 22 with respect to the transporting route W is adjusted by the truck 21 and the control device 37 based on the detection results of the upper side position detection device 36a or the lower side position detection device 36b, and the inspection device 22 and the container C are positioned at a positional relationship appropriate for inspection.

Therefore according to this quay crane 1, the inspection device 22 always inspects the container C under a constant condition, and excellent inspection results can always be obtained.

Moreover, since the inspection condition is maintained constantly in this way (for example, the size and imaging angle of the obtained radiographic image become constant), inspection results of different containers C can be compared easily, and automation or semi-automation of inspection result evaluation can be easily achieved.

Furthermore, in this manner, the quay crane 1 enables nondestructive inspection of the container C can be performed during cargo handling. Therefore inspection of the container C can be performed without decreasing the cargo transporting efficiency. Moreover, a suspicious container C can be identified at an early stage by performing inspection of the container C at the first stage on receipt at the container terminal T. Alternatively, the contents of the container C at shipping can be guaranteed by performing inspection of the container C at the final stage of shipping from the container terminal T.

Furthermore, with the quay crane 1, the inspection area A of the inspection device 22 is set on the transporting route W of the container C by the quay crane 1. Therefore, the space used for the inspection at the container terminal T can be decreased.

Moreover, with the quay crane 1, the inspection device 22 is provided at a position distanced from the ground. Therefore it is difficult for people to accidentally come close to the vicinity of the inspection device 22. As a result, entry of people to the vicinity of the inspection device 22 can be managed easily, thus facilitating safety management of the inspection device 22.

Moreover, by providing the inspection device 22 distanced from the ground, the space below the inspection device 22 at the container terminal T can be utilized.

Here, in the above embodiment, an example has been described in which by disposing the inspection device 22 on the truck 21 which can move on the connection member 13a, and moving the truck 21 in a substantially horizontal direction, the position of the inspection device 22 with respect to the transported container C in the vertical part of the transporting route W is adjusted. However, the installation position and direction of movement of the inspection device 22 are not limited to this, and other arrangements may be employed.

For example, the construction may be such that the position of the inspection device 22 with respect to the container C transported on the horizontal part of the transporting route W is adjusted, by installing the inspection device 22 on an elevator device that can raise and lower with respect to the boom 14, and raising and lowering the elevator device.

Furthermore, in the above embodiment, an example of the present invention applied to the purpose of nondestructively inspecting inside a container has been described. However, the invention is not limited to this, and may be employed to the purpose of, for example, appearance inspection or reading labels. In this case, an imaging device is employed instead of the inspection device 22.

Moreover, in the above embodiment, the example of the present invention applied to a quay crane has been described. However, the invention is not limited to this, and it may be applied to another crane which is used in the container terminal T such as a yard crane.

Second Embodiment

Figure 3:
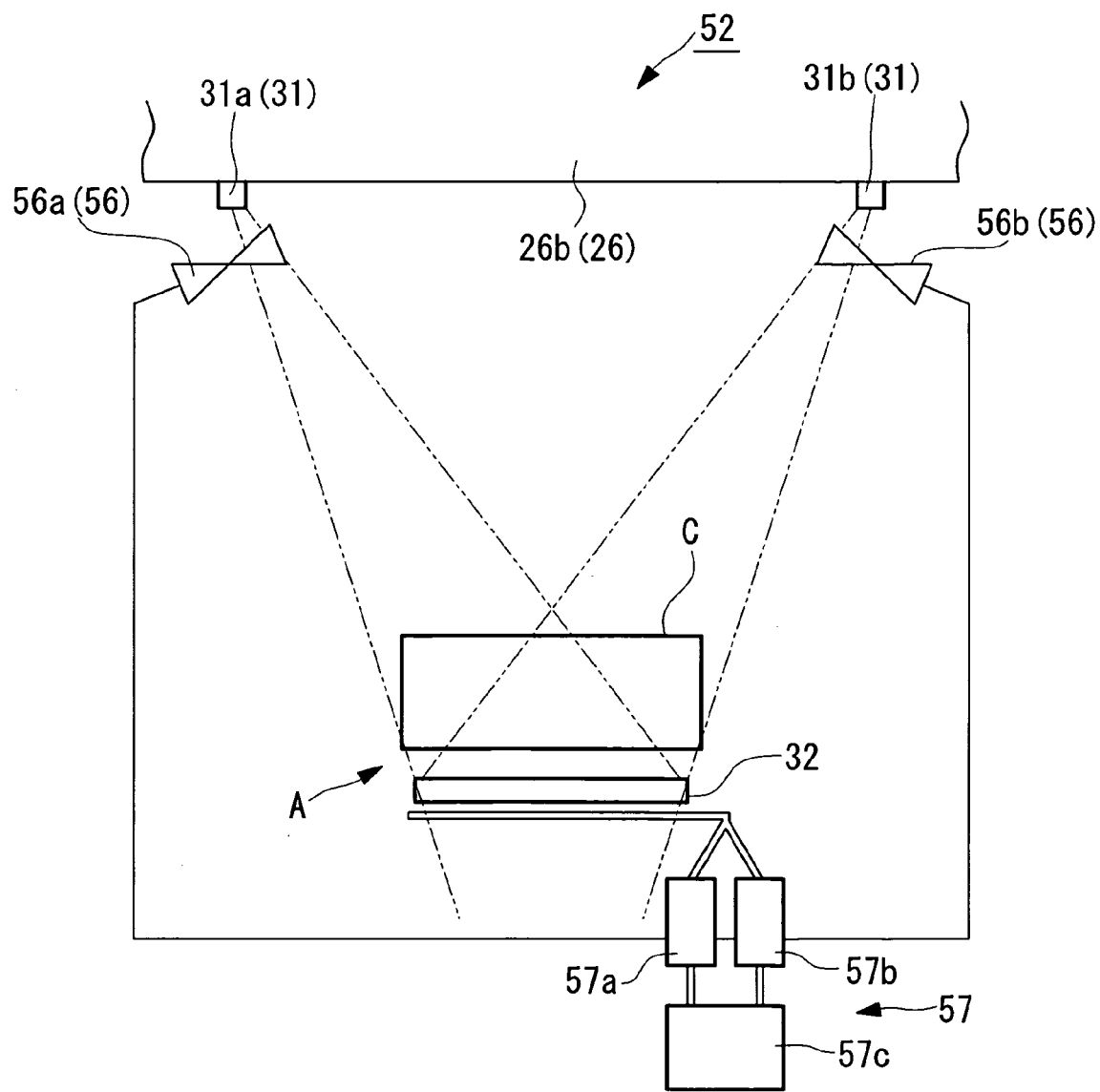
FIG. 3 is a plan view showing the construction of a quay crane according to a second embodiment of the present invention.

Hereunder, a second embodiment according to the present invention is described, with reference to FIG. 3.

The quay crane described in the present embodiment is characterized mainly in that an inspection device 52 is provided for the quay crane 1 described in the first embodiment instead of the inspection device 22. The same components as those of the quay crane 1 described in the first embodiment are denoted with the same reference symbols, and their detailed descriptions are omitted below.

As with the inspection device 22, the inspection device 52 is constructed such that radiation sources 31 and a detector 32 are disposed on either side of an inspection area A, into which a container C, being an inspection object, enters, and a plurality of radiation sources 31 disposed in different positions respectively irradiate radiations to the same detector.

In the present embodiment, a radiation source 31a and a radiation source 31b are installed on one of sub frames 26b that constitute the truck 21, and the radiation source 31a is installed on one end side of this one sub frame 26b, and the radiation source 31b is installed on another end side of this one sub frame 26b. Moreover, one detector 32 is installed on the other sub frame 26b (not shown in FIG. 3) so that its detection area faces the one sub frame 26b.

Hereunder, for this inspection device 52, the array direction of the radiation sources 31a and 31b is the widthwise direction (the lengthwise direction of the sub frame 26), and the direction along the connection member 13a (not shown in FIG. 3) (the direction from one sub frame 26b towards the other sub frame 26b) is the depthwise direction.

Regarding the radiation sources 31a and 31b, as shown by the two-dot chain lines in FIG. 3, the construction is such that the radiation is respectively irradiated towards the inspection area A so as to spread in an approximate fan shape on a substantially horizontal plane. That is to say, in this inspection device 52, the construction is such that these radiation sources 31a and 31b respectively irradiate the radiation to the same detector 32 from different positions. Moreover, the irradiation range of the radiation from these radiation sources 31a and 31b is set to cover the entire inspection area A including the aforementioned depthwise direction. Therefore, the irradiation areas of radiation from each of the radiation sources 31a and 31b overlap.

The radiation sources 31a and 31b are respectively disposed at positions outside in the widthwise direction, from the front position of the edge part of the inspection area A, and the radiographic image of the container C is projected to the detector 32, onto an area which is smaller in the widthwise direction than the inspection area A.

The detector 32 is a detector array having a plurality of radiation detectors arrayed in the widthwise direction, and its detection area has a strip shape along the widthwise direction. Moreover, the length of the detector 32 in the widthwise direction is set to be shorter than the length of the inspection area A in the widthwise direction.

Furthermore, this inspection device 52 is provided with a modulation device 56 which assign different modulations to each radiation emitted from each of the radiation sources 31a and 31b, and an identification device 57 that distinguishes the modulation assigned to the radiation incident on the detector 32, based on the output of the detector 32, and identifies which one of the radiation sources 31 this radiation has been emitted from.

The modulation device 56 has; a modulation device 56a which assigns a modulation to the radiation emitted from the radiation source 31a, and a modulation device 56b which assigns a modulation to the radiation emitted from the radiation source 31b.

In the present embodiment, choppers are used as these modulation devices 56a and 56b. The choppers modulate the radiation emitted from the radiation sources 31, on the near side of the inspection area A, to convert the radiation which reaches the detector into a pulsed radiation of a frequency specific for the radiation source.

The modulation device 56a is constructed to convert the radiation emitted from the radiation source 31a into a pulsed radiation of a frequency f1, and the modulation device 56b is constructed to convert the radiation emitted from the radiation source 31b into a pulsed radiation of a frequency f2 (where f2≠f1).

The identification device 57 is provided with: a lock-in amplifier 57a which takes out from the output of the detector 32, a component which is repeated at the frequency f1 specific to the radiation source 31a; a lock-in amplifier 57b which takes out from the output of the detector 32, a component which is repeated at the frequency f1 specific to the radiation source 31b; and a computing device 57c which respectively forms a radiographic image created by the radiation emitted from the radiation source 31a, and a radiographic image created by the radiation emitted from the radiation source 31b, based on the components which these lock-in amplifiers 57a and 57b have taken out.

Nondestructive inspection of the container C that uses the quay crane constructed in this way, is performed in the same way as the inspection of the container C that uses the quay crane 1 shown in the first embodiment, in parallel with transportation of the container C, during the process of transporting the container C along the transporting route of the quay crane.

Specifically, by transporting the container C and passing it through the inspection area A on the transporting route, each part of the container C from the front side in the transportation direction to the rear side in the transportation direction is sequentially exposed between the radiation sources 31 and the detector 32. The inspection device 52 is operated in synchronization with the operation of the quay crane, and nondestructive inspection of the inside of the container C is performed from the bottom to the top of the container C, by the inspection device 52.

Hereunder, nondestructive inspection of a container C by the inspection device 52 according to the present embodiment is described in detail.

In this inspection device 52, radiation is respectively irradiated by the radiation sources 31a and 31b from different positions towards the same detector 32 through the container C. In other words, the respective radiations transmitted through the container C from different directions enter the one detector 32.

These radiations are respectively assigned different modulations for each radiation source by the modulation devices 56a and 56b.

The output of the detector 32 when these modulated radiations enter the detector 32 reflects the modulations assigned to the incident radiations.

In this inspection device 52, the modulation assigned to the radiation that enters the detector 32 is identified by the identification device 57 based on the output of the detector 32, and which radiation source the radiation, which has entered the detector 32, is emitted from is identified based on the modulation information.

More specifically, the lock-in amplifier 57a extracts from the output of the detector 32, the signal repeated at frequency f1, and based on this extracted signal, the computing device 57c forms a radiographic image of the container C created by the radiation emitted from the radiation source 31a.

In the same way, the lock-in amplifier 57b extracts the signal repeated at frequency f2, and based on this extracted signal, the computing device 57c forms a radiographic image of the container C created by the radiation emitted from the radiation source 31b.

Thus, in this inspection device 52, one detector 32 can separately identify for each radiation source, radiation irradiated from each of the radiation sources 31a and 31b, whose irradiation positions are overlapping.

As a result, in this inspection device 52, while providing two radiation sources 31 and setting the inspection area A large, only one detector 32 needs to be installed, and the number of installed expensive detectors 32 can be minimized compared to a conventional nondestructive inspection device.

Furthermore, the radiation sources 31a and 31b are respectively disposed at positions outside in the widthwise direction, from the front position of the edge part of the inspection area A, and the radiographic image of the container C is projected to the detector 32, onto an area which is smaller in the widthwise direction than the inspection area A.

Therefore, the entire length of the detector 32 can be made shorter than the width of the container C, and the facility cost made lower.

Also, in this way, by using a smaller sized detector 32, deformation of the detector 32 due to its own weight becomes small, so that the detection accuracy of the detector 32 becomes high, and a clearer radiographic image can be obtained. Therefore, inspection at a higher degree of accuracy becomes possible.

Furthermore, the inspection device 52 itself becomes smaller than the conventional one, so that more options of crane installation location become available and various operations become possible.

Moreover, in the inspection device 52, since the radiation is irradiated from two different directions to the inspection region A, radiographic images of the container C from two different directions are obtained. That is to say, in this inspection device 52, while having one detector 32 installed, information for the depthwise direction of the container C can also be obtained, by inspecting the container C from two different directions.

As a result, with the inspection device 52, while keeping down the installation cost, it becomes possible to discover abnormalities which would have been missed in inspection from one direction, so that inspection at a higher degree of accuracy can be performed.

Here, in the aforementioned second embodiment, the detector 32 is constructed having a scintillator which converts the incident radiation into visible light, and a photomultiplier which detects the visible light generated by the scintillator and converts it into an electrical signal, and detects the radiation intensity based on the output of the photomultiplier. However, the invention is not limited to this and another construction may be employed as the construction of the detector 32. For example, for the detector 32, instead of the scintillator, a semiconductor detection element such as a Si (silicon) radiation detection element or a CdTe (cadmium telluride) radiation detection element can also be applied. Moreover, also for the method of detecting the signal obtained by the detector 32, the invention is not limited to the method that uses a lock-in amplifier, and it may be constructed to detect the radiation intensity by using for example a photon counter in a lock-in mode.

What is claimed is:

1. A crane equipped with an inspection device that inspects cargo, the crane comprising:
    a main body of said inspection device;
    a holding part which holds said cargo;
    a holding part driving device which moves said holding part along a transporting route;
    a position adjustment device which adjusts a position of said inspection device with respect to said transporting route;
    a position detector which detects the relative positions of said inspection device and said cargo; and
    a control device which controls operation of said position adjustment device based on detection results of said detector so that said inspection device and said cargo are positioned appropriately for inspection,
    wherein said main body inspects cargo which have been transported along said transporting route.

2. The crane according to claim 1, wherein said crane is a quay crane.

3. The crane according to claim 2, wherein said inspection device comprises:
    a detector that detects radiation intensity;
    a plurality of radiation sources on either side of an inspection area into which said cargo enters, that respectively irradiate radiation to the same said detector from different positions;
    a modulation device which respectively assigns a different modulation to each of said radiations emitted from each of said radiation sources; and
    an identification device which distinguishes said modulation assigned to the radiation that has entered said detector based on an output of said detector, and which determines from which of said radiation sources said radiation has been irradiated.

4. The crane according to claim 1, wherein said inspection device comprises:
    a detector that detects radiation intensity;
    a plurality of radiation sources on either side of an inspection area into which said cargo enters, that respectively irradiate radiation to the same said detector from different positions;
    a modulation device which respectively assigns a different modulation to each of said radiations emitted from each of said radiation sources; and
    an identification device which distinguishes said modulation assigned to the radiation that has entered said detector based on an output of said detector, and which determines from which of said radiation sources said radiation has been irradiated.

* * * * *